United States Patent
Zhang et al.

(10) Patent No.: US 8,515,744 B2
(45) Date of Patent: Aug. 20, 2013

(54) METHOD FOR ENCODING SIGNAL, AND METHOD FOR DECODING SIGNAL

(75) Inventors: Dejun Zhang, Beijing (CN); Lei Miao, Beijing (CN); Jianfeng Xu, Munich (DE); Fengyan Qi, Beijing (CN); Qing Zhang, Shenzhen (CN); Lixiong Li, Shenzhen (CN); Fuwei Ma, Shenzhen (CN); Yang Gao, Mission Viejo, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/172,575

(22) Filed: Jun. 29, 2011

(65) Prior Publication Data
US 2011/0313761 A1      Dec. 22, 2011

Related U.S. Application Data

(63) Continuation of application No. PCT/CN2009/076306, filed on Dec. 30, 2009.

(30) Foreign Application Priority Data

Dec. 31, 2008  (CN) ............. 2008 1 0247427
Jun. 25, 2009  (CN) ............. 2009 1 0151835

(51) Int. Cl.
*G10L 19/00* (2013.01)

(52) U.S. Cl.
USPC ........... 704/219; 704/207; 704/500; 704/501; 704/503; 704/504

(58) Field of Classification Search
USPC .................... 704/207, 219, 500–504
See application file for complete search history.

(56) References Cited

U.S. PATENT DOCUMENTS 5,652,903 A * 7/1997 Weng et al. ............ 712/35
5,659,698 A * 8/1997 Weng et al. ............ 711/220

(Continued)

FOREIGN PATENT DOCUMENTS

CN   1465044 A   12/2003
CN   1922659 A   2/2007

(Continued)

OTHER PUBLICATIONS

Itu-T, "Series G: Transmission Systems and Media, Digital Systems and Networks, Digital terminal equipments—Coding of voice and audio signals, Lossless compression of G.711 pulse code modulation", International Telecommunication Union, G.711.0, pp. i-iv and 1-64, (Sep. 2009).

(Continued)

*Primary Examiner* — Leonard Saint Cyr
(74) *Attorney, Agent, or Firm* — Huawei Technologies Co., Ltd.

(57) ABSTRACT

Method, apparatus, and system for encoding and decoding signals are disclosed. The encoding method includes: converting a first-domain signal into a second-domain signal; performing Linear Prediction (LP) processing and Long-Term Prediction (LTP) processing for the second-domain signal; obtaining a long-term flag according to a decision criterion; obtaining a second-domain predictive signal according to the LP processing result and the LTP processing result when the long-term flag is a first flag; or obtaining a second-domain predictive signal according to the LP processing result when the long-term flag is a second flag; converting the second-domain predictive signal into a first-domain predictive signal, calculating a first-domain predictive residual signal; and outputting a bit stream that includes the first-domain predictive residual signal. Subsequent encoding or decoding process is performed adaptively according to the long-term flag; and it is not always necessary to consider the LTP processing result, thus improving the compression performance of codec.

22 Claims, 9 Drawing Sheets

(56) References Cited

U.S. PATENT DOCUMENTS

| | | | |
|---|---|---|---|
| 5,933,803 | A | 8/1999 | Ojala |
| 6,094,630 | A | 7/2000 | Nomura |
| 6,240,386 | B1 | 5/2001 | Thyssen |
| 2004/0148162 | A1 | 7/2004 | Fingscheidt |
| 2004/0167772 | A1* | 8/2004 | Erzin .......................... 704/207 |
| 2005/0075873 | A1* | 4/2005 | Makinen .................... 704/230 |
| 2005/0102136 | A1* | 5/2005 | Makinen et al. ............ 704/214 |
| 2005/0192797 | A1 | 9/2005 | Makinen |
| 2005/0251387 | A1 | 11/2005 | Jelinek et al. |
| 2007/0143118 | A1 | 6/2007 | Chen et al. |
| 2007/0239462 | A1* | 10/2007 | Makinen et al. ............ 704/500 |

FOREIGN PATENT DOCUMENTS

| | | |
|---|---|---|
| CN | 101197577 A | 6/2008 |
| EP | 0848374 | 6/1998 |
| EP | 1388146 A2 | 2/2004 |
| JP | 6-130994 A | 5/1994 |
| RU | 2316059 C2 | 1/2008 |
| RU | 2319222 C1 | 3/2008 |
| WO | WO95/16260 | 6/1995 |
| WO | WO 95/16260 | 6/1995 |
| WO | WO 02/35522 A1 | 5/2002 |
| WO | 02095734 A2 | 11/2002 |
| WO | 2005081231 A1 | 9/2005 |
| WO | WO 2007/128661 A1 | 11/2007 |

OTHER PUBLICATIONS

Written Opinion of the International Searching Authority in International Application No. PCT/CN2009/076306 dated Mar. 29, 2010.
International Search Report from the Chinese Patent Office in International Application No. PCT/CN2009/076306 mailed Apr. 15, 2010.
Extended EU Search Report issued in related 09836079.5 dated Oct. 6, 2011.
Office Action issued in related Russion Application No. 2011132152/20(047347) dated Sep. 22, 2011.
European Communication pursuant to Article 94(3) dated Jun. 18, 2012, issued in related Application No. 09 836 079.5-1224.
Rejection decision issued in corresponding Japanese patent application 2011-543970, dated Nov. 27, 2012,and English translation thereof, total 4 pages.
Notice of allowance issued in corresponding Russian patent application 2011132152, dated Jan. 23, 2013,and English translation thereof, total 34 pages.
Rejection decision issued in corresponding Japanese patent application 2011-543970, dated Apr. 9, 2013, and English translation thereof, total 4 pages.
1st reexamination office action issued in corresponding Korea patent application 10-2011-7017706, dated May 3, 2013, and English translation thereof, total 6 pages.

* cited by examiner

METHOD FOR ENCODING SIGNAL, AND METHOD FOR DECODING SIGNAL

CROSS-REFERENCE TO RELATED APPLICATIONS

This application is a continuation of International Application No PCT/CN2009/076306, filed on Dec. 30, 2009, which claims priority to Chinese Patent Application No. 200810247427.6, filed on Dec. 31, 2008 and Chinese Patent Application No. 200910151835.6, filed on Jun. 25, 2009, all of which are hereby incorporated by reference in their entireties.

FIELD OF THE DISCLOSURE

The present disclosure relates to speech encoding and decoding, and in particular, to a method, apparatus, and system for encoding and decoding signals.

BACKGROUND OF THE DISCLOSURE

One of the coding models widely applied in the speech coding field is Code Excited Linear Prediction (CELP). The CELP model uses an almost white excitation signal to excite two time-varying linear recursive filters. The excitation signal is generally selected out of a codebook composed of Gaussian white noise sequences. The feedback loop of each filter includes a predictor. One of the predictors is a long-term predictor (or a pitch predictor), which is represented by $P(z)$. $P(z)$ is used to generate the tone structure of a voiced speech (for example, the fine structure of a spectrum). Another common predictor is a short-term predictor, represented by $F(z)$. $F(z)$ is used to recover the short-term spectrum envelope of a speech. This model derives from its reverse process. That is, $F(z)$ is used to remove the redundancy of a near sample point of the speech signal, and $P(z)$ is used to remove the redundancy of a far sample point of the speech signal. A normalized residual signal is obtained through two levels of prediction. The residual signals take on standard normal distribution approximately.

When the CELP model is applied to the lossy compression field, the speech signal $x(i)$ undergoes Linear Predictive Coding (LPC) analysis first to obtain the LPC residual signal res(i). After the LPC residual signal res(i) is framed, each subframe signal undergoes Long-Term Prediction (LTP) analysis to obtain the corresponding adaptive codebook and adaptive codebook gain. The adaptive codebook may be searched out in many methods such as autocorrelation. After the long-term dependence of the LPC residual signal res(i) is removed, the LTP residual signal $x2(i)$ is obtained. After an algebraic codebook is used to characterize or fit the LTP residual signal $x2(i)$, the whole coding process is completed. Finally, the adaptive codebook and the fixed codebook are coded and written into the bit stream, and joint vector quantization or scalar quantization is performed for the adaptive codebook gain and the fixed codebook gain. In the codebook, either the adaptive codebook gain or the fixed codebook gain is selected as the best gain. The index corresponding to the best gain is transmitted to the decoder. The whole coding process takes place in a Pulse Code Modulation (PCM) domain.

In the lossless compression field, a Moving Pictures Experts Group Audio Lossless Coding (MPEG ALS) apparatus also uses the short-term and long-term dependence of speech signals for prediction. Its prediction process is: First, LPC is performed for a speech signal, and the LPC coefficient undergoes entropy coding and is written into a bit stream; LTP is performed for the LPC residual signal to obtain the pitch and the pitch gain of the LTP, and the LPC residual signal is written into the bit stream; after the LTP, the LTP residual signal is obtained; and then the LTP residual signal undergoes entropy coding and is written into the bit stream, and the whole coding process is ended.

In the prior art described above, when the speech signal is less periodic, the LTP processing almost makes no contribution. In this case, the LTP residual signal is still written into the bit stream. Consequently, the pitch gain quantization consumes too many bits, and the compression performance of the coder is reduced.

SUMMARY OF THE DISCLOSURE

Embodiments of the present disclosure provide a method, apparatus, and system for encoding and decoding signals to improve the compression performance of the codec.

A signal encoding method includes:
converting a first-domain signal into a second-domain signal;
performing Linear Predictive (LP) processing and LTP processing for the second-domain signal;
obtaining a long-term flag according to decision criteria;
obtaining a second-domain predictive signal according to the LP processing result and the LTP processing result when the long-term flag is a first flag, and obtaining a second-domain predictive signal according to the LP processing result when the long-term flag is a second flag;
converting the second-domain predictive signal into a first-domain predictive signal, and calculating a first-domain predictive residual signal; and
outputting a bit stream that comprises a first-domain predictive residual signal.

A signal decoding method includes:
decoding a received bit stream to obtain a decoded first-domain predictive residual signal;
decoding the first sample point of a current frame signal;
performing the following decoding steps consecutively for every current sample point from the second sample point of the current frame signal:
calculating an LP signal of a current sample point according to a second-domain signal of the decoded sample point;
obtaining a second-domain predictive signal according to the LP signal and an LTP contribution signal if the obtained long-term flag is a first flag, wherein the LTP contribution signal is obtained according to the LP residual signal of the decoded sample point; or
obtaining a second-domain predictive signal according to the LP contribution signal if the obtained long-term flag is not a first flag;
converting the second-domain predictive signal into a first-domain predictive signal, and decoding a first-domain signal of the current sample point according to the first-domain predictive residual signal and the first-domain predictive signal; and
converting the first-domain signal of the current sample point into a second-domain signal, and obtaining an LP residual signal according to the second-domain signal and the LP signal.

A signal encoding apparatus includes:
a converting module, adapted to: convert a first-domain signal into a second-domain signal, and convert a second-domain predictive signal into a first-domain predictive signal;
an LP module, adapted to perform LP processing for the second-domain signal;

an LTP module, adapted to perform LTP processing for the second-domain signal;

a deciding module, adapted to obtain a long-term flag according to decision criteria;

a second-domain prediction module, adapted to: obtain the second-domain predictive signal according to the LP processing result and the LTP processing result when the long-term flag is a first flag; and obtain the second-domain predictive signal according to the LP processing result when the long-term flag is a second flag;

a first-domain predictive residual module, adapted to calculate a first-domain predictive residual signal according to the first-domain predictive signal;

an outputting module, adapted to output a bit stream that includes the first-domain predictive residual signal.

A signal decoding apparatus includes:

a bit stream decoding module, adapted to decode a received bit stream to obtain a first-domain predictive residual signal;

a first sample point decoding module, adapted to decode a first sample point of the signals of a current frame;

an LP module, adapted to calculate an LP signal of a current sample point according to a second-domain signal of the decoded sample point;

a second-domain prediction module, adapted to: obtain a second-domain predictive signal according to the LP signal and an LTP contribution signal if the obtained long-term flag is a first flag, or obtain a second-domain predictive signal according to the LP signal if the obtained long-term flag is not a first flag, wherein the LTP contribution signal is obtained according to the LP residual signal of the decoded sample point;

a converting module, adapted to: convert the second-domain predictive signal into a first-domain predictive signal, and convert the first-domain signal of the current sample point into the second-domain signal;

a current sample point decoding module, adapted to decode the first-domain signal of the current sample point according to the first-domain predictive residual signal and the first-domain predictive signal; and an LP residual module, adapted to obtain an LP residual signal according to the second-domain signal and the LP predictive signal.

A signal codec system includes:

a signal coding apparatus, adapted to: convert a first-domain signal into a second-domain signal; perform LP processing and LTP processing for the second-domain signal; obtain a long-term flag according to decision criteria; obtain a second-domain predictive signal according to the LP processing result and the LTP processing result when the long-term flag is a first flag; obtain a second-domain predictive signal according to the LP processing result when the long-term flag is a second flag; convert the second-domain predictive signal into a first-domain predictive signal, and calculate a first-domain predictive residual signal; and output a bit stream that includes the first-domain predictive residual signal;

a signal decoding apparatus, adapted to: decode the received bit stream to obtain the first-domain predictive residual signal and the long-term flag; decode a first sample point of the signals of a current frame; perform the following decoding steps consecutively for every current sample point from a second sample point of the signals of the current frame: calculate an LP signal of a current sample point according to the second-domain signal of the decoded sample point; obtain the second-domain predictive signal according to the LP signal and an LTP contribution signal if the obtained long-term flag is the first flag, or obtain the second-domain predictive signal according to the LP signal if the obtained long-term flag is not the first flag, where the LTP contribution signal is obtained according to the LP residual signal of the decoded sample point; convert the second-domain predictive signal into the first-domain predictive signal, and decode the first-domain signal of the current sample point according to the first-domain predictive residual signal and the first-domain predictive signal; and convert the first-domain signal of the current sample point into the second-domain signal, and obtain the LP residual signal according to the second-domain signal and the LP signal.

In the embodiments of the present disclosure, a subsequent encoding or decoding process is performed adaptively according to the long-term flag; when the long-term flag is the second flag, it is not necessary to consider the LTP processing result, thus improving the compression performance of the codec.

DETAILED DESCRIPTION OF THE DISCLOSURE

The present disclosure is hereinafter described in more detail with reference to accompanying drawings and exemplary embodiments.

Figure 1:
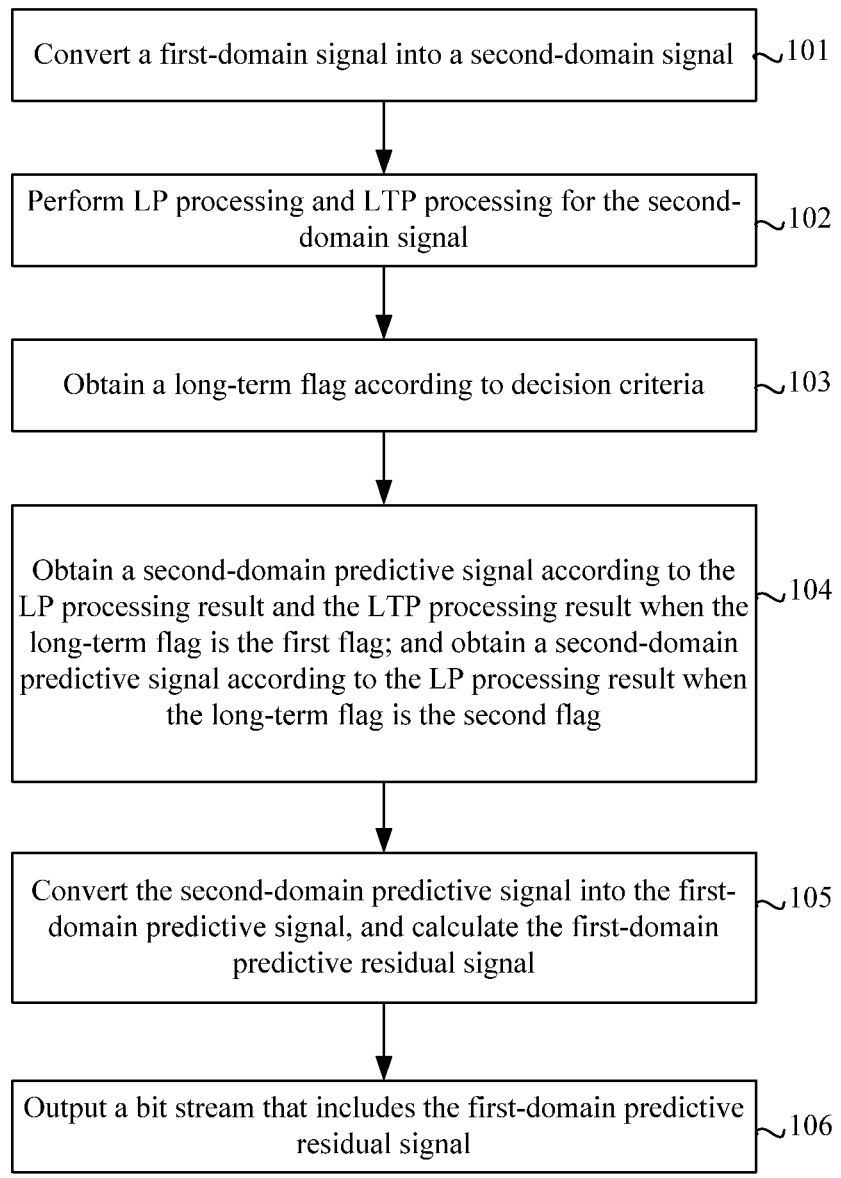
FIG. 1 is a flowchart of a signal encoding method in the first embodiment of the present disclosure.

FIG. 1 is a flowchart of a signal encoding method in the first embodiment of the present disclosure. The method includes the following steps:

Step 101: Convert a first-domain signal into a second-domain signal.

Step 102: Perform LP processing and LTP processing for the second-domain signal.

Step 103: Obtain a long-term flag according to decision criteria.

Step 104: Obtain a second-domain predictive signal according to the LP processing result and the LTP processing result when the long-term flag is the first flag; and obtain a second-domain predictive signal according to the LP processing result when the long-term flag is the second flag.

Step 105: Convert the second-domain predictive signal into the first-domain predictive signal, and calculate the first-domain predictive residual signal.

Step 106: Output a bit stream that includes the first-domain predictive residual signal.

In this embodiment, the long-term flag is obtained according to the decision criteria; the second-domain predictive signal is obtained according to the LP processing result and the LTP processing result when the long-term flag is the first flag, or the second-domain predictive signal is obtained according to the LP processing result when the long-term flag is the second flag, and the bit stream is obtained according to the second-domain predictive signal. In this embodiment, the subsequent encoding process is performed adaptively according to the long-term flag. When the long-term flag is the second flag, it is not necessary to consider the LTP processing result, thus improving the compression performance of the codec.

Figure 2:
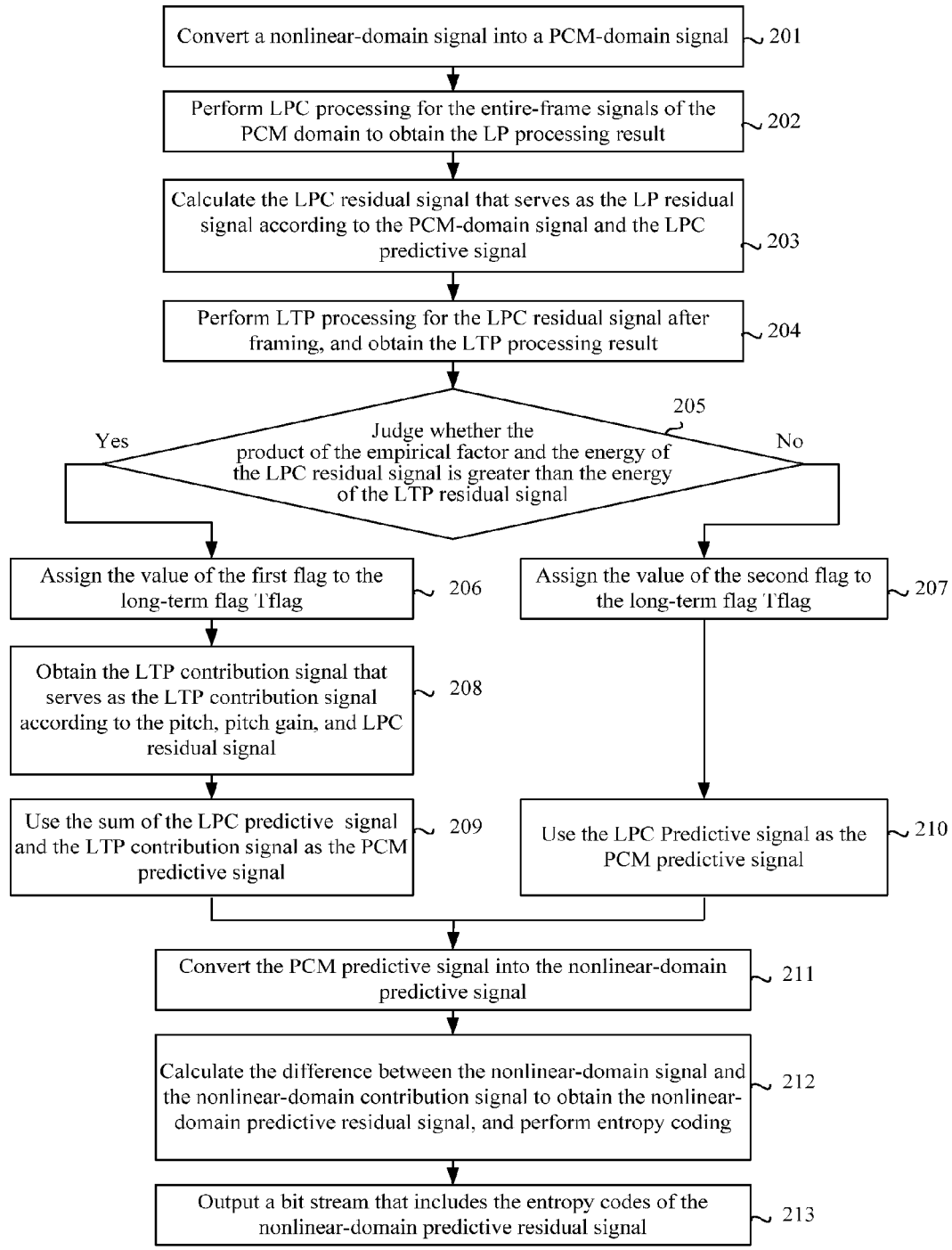
FIG. 2 is a flowchart of a signal encoding method in the second embodiment of the present disclosure.

FIG. 2 is a flowchart of a signal encoding method in the second embodiment of the present disclosure. In this embodiment, the first domain is a nonlinear domain, and further, the first domain may be A-law or Mu-law; the second domain is a PCM domain; the LP processing is LPC processing, and the LTP processing is Long Term Prediction processing.

The method in this embodiment includes the following steps:

Step 201: Convert a nonlinear-domain signal into a PCM-domain signal.

x(i) represents the nonlinear-domain signal, and y(i) represents the PCM-domain signal. Supposing the conversion process involves precision loss, the corresponding back-conversion process involves no precision loss.

Step 202: Perform LPC processing for the entire-frame signal y(i) of the PCM domain to obtain an LP processing result. The LP processing result includes the LPC predictive signal y'(i) which serves as an LP signal, and includes an LP coefficient, as expressed in the following formula:

$$y'(i) = \sum_{j=1}^{lpc\_order} a_j \cdot y(i-j), i = 1, 2, \ldots, L-1 \quad (1)$$

where $a_j$ is an LP coefficient; L is the frame length; and lpc_order is an LP order. Supposing y'(0)=0, when i<0, y(i)=0.

Step 203: Calculate the LPC residual signal res(i) that serves as an LP residual signal according to the PCM-domain signal y(i) and the LPC predictive signal y'(i), where the LPC residual signal may be understood as an LP processing result.

$$res(i)=y(i)-y'(i), i=0,1,\ldots,L-1 \quad (2)$$

Step 204: Perform framing for the LPC residual signal res(i) and then perform LTP processing to obtain an LTP processing result. The framing operation is optional, and may be an adaptive framing operation. The LTP processing result includes a pitch and a pitch gain.

Specifically, the LTP processing in this step may include: performing pitch search for the LPC residual signal, obtaining the best pitch of the LPC residual signal, or obtaining both the best pitch and the pitch gain of the LPC residual signal.

Specifically, this step may include: if no framing is performed, performing pitch search for the PCM-domain signal of the current frame to obtain the best pitch of the PCM-domain signal, and then performing fine search for the LPC residual signal according to the best pitch of the PCM-domain signal to obtain the best pitch of the LPC residual signal or obtain both the best pitch and the pitch gain of the LPC residual signal; if framing is performed, before the framing operation, performing pitch search for the PCM-domain signal of the current frame to obtain the best pitch of the PCM-domain signal, using the best pitch of the PCM-domain signal of the current frame as the best pitch of the first subframe, and performing framing for the LPC residual signal according to the best pitch; performing fine search for the pitch of each subframe in the residual domain, namely, searching for the pitch of each subframe around the pitch of the previous subframe, thus facilitating differential coding for the subframe pitch, and obtaining the best pitch of each subframe, or obtaining both the best pitch and the pitch gain.

In the foregoing process of searching for a pitch, if no pitch gain is obtained, the pitch gain may be selected adaptively according to the obtained best pitch.

In the LPC processing, the prediction result of the first few samples is generally inaccurate. To avoid impacting the LTP performance, this embodiment specifies that the first M samples do not participate in the LTP processing, where M is a specified number. The pitch search is performed for the LPC residual signals res(i) of the samples other than the first M samples to obtain the pitch, pitch gain, and LTP residual signal z(i) of each subframe.

Figure 3:
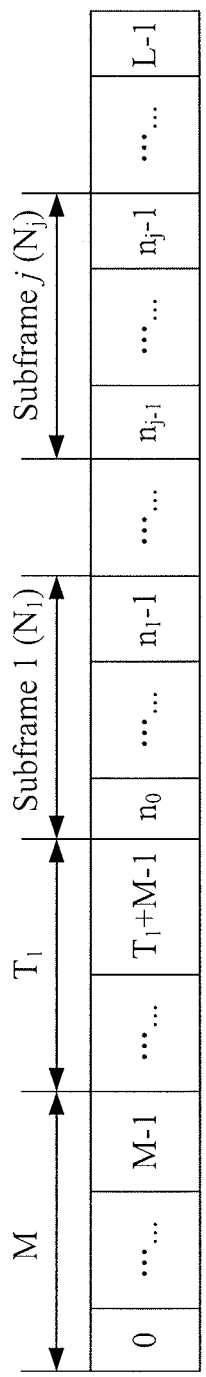
FIG. 3 shows signals of a frame after framing in the signal encoding method in the second embodiment of the present disclosure.

FIG. 3 shows signals of a frame after framing in the signal encoding method in the second embodiment of the present disclosure. The first M samples do not participate in the framing or LTP processing, and the relation between M and lpc_order is: $0 \leq M \leq lpc\_order$. $T_1$ represents the pitch of the first subframe, and the samples from M to $T_1+M-1$ are the samples in the buffer. Supposing $n_0=T_1+M$, then the samples from $n_0$ to $n_1-1$ are the samples in the first subframe, and the length of the first subframe is $N_1=n_1-n_0$. By analogy, the samples from $n_{j-1}$ to $n_j-1$ are the samples in subframe j, and the length of subframe j is $N_j=n_j-n_{j-1}$. The total quantity of samples of the signals in a frame is L.

For the samples from 0 to $T_1+M-1$, the following equation applies:

$$z(i)=res(i), i=0,1,\ldots,T_1+M-1. \quad (3)$$

For the samples of the first subframe, the following equation applies:

$$z(i)=res(i)-g_1 \cdot res(i-T_1), i=n_0,\ldots,n_1-1. \quad (4)$$

where $g_1$ represents the pitch gain of the first subframe.

For the samples of subframe j, the following equation applies:

$$z_j(i)=res_j(i)-g_j \cdot res_j(i-T_j), i=n_{j-1},\ldots,n_j-1. \quad (5)$$

where $T_j$ represents the pitch of subframe j, and $g_j$ represents the pitch gain of subframe j.

Step 205: Judge whether the product of the empirical factor and the energy of the LPC residual signals res(i) which have undergone no LTP processing is greater than the energy of the LTP residual signals z(i) which have undergone LTP processing; if so, proceed to step 206; otherwise, go to step 207.

$$E1 = \sum_{i=k}^{L-1} z(i) \cdot z(i) \quad (6)$$

$$E = \sum_{i=k}^{L-1} res(i) \cdot res(i) \quad (7)$$

E1 represents the energy of the LTP residual signal z(i); E represents the energy of the LPC residual signal res(i); and k may be 0 or M. This step judges whether E*fac is greater than E1, where fac is an empirical factor. Generally, fac=0.94.

In another embodiment, an alternative of this step is: Judge whether the product of the empirical factor and the sum of absolute values of the LPC residual signals res(i) which have undergone no LTP processing is greater than the sum of absolute values of the LTP residual signals z(i) which have undergone LTP processing; if so, proceed to step 206; otherwise, go to step 207.

Step 206: Assign a value of the first flag to the long-term flag Tflag. Specifically, let Tflag be 1. Go to step 208.

The long-term flag may be the trigger signal of the LTP module. If Tflag is equal to 1, it indicates that the LTP module is enabled.

Step 207: Assign a value of the second flag to the long-term flag Tflag. Specifically, let Tflag be 0. Go to step 210. If Tflag is equal to 0, it indicates that the LTP module is disabled.

Step 208: Obtain the LTP contribution signal res'(i) which serves as the LTP contribution signal according to the pitch, pitch gain and the LPC residual signal res(i). This step may also be included in step 204. That is, this step may be included in the LPC processing, and the LTP processing result further includes the LTP contribution signal res'(i), as expressed in formula (8):

$$res'(i) = g \cdot res(i-T) \qquad (8)$$

Step 209: Use the sum of the LPC predictive signal y'(i) and the LTP contribution signal res'(i) as the PCM predictive signal y''(i), and go to step 211, as expressed in formula (9):

$$y''(i) = y'(i) + res'(i) \qquad (9)$$

Step 210: Use the LPC predictive signal y'(i) as the PCM predictive signal y''(i), and proceed to step 211, as expressed in formula (10):

$$y''(i) = y'(i) \qquad (10)$$

Step 211: Convert the PCM predictive signal y''(i) into the nonlinear-domain predictive signal x'(i), as expressed in formula (11):

$$x'(i) = PCM2A[y''(i)] \qquad (11)$$

The function PCM2A[ ] refers to converting the PCM-domain signal into the A-law signal.

Step 212: Calculate the difference between x(i) and x'(i) to obtain the nonlinear-domain predictive residual signal, and perform entropy coding for the nonlinear-domain predictive residual signal.

Step 213: Output the bit stream that includes the entropy code of the nonlinear-domain predictive residual signal and the long-term flag. Specifically, when Tflag is equal to 0, the bit stream further includes an LPC coefficient $a_j$; when Tflag is equal to 1, the bit stream further includes an LPC coefficient $a_j$, a pitch, and a pitch gain.

In some embodiments, in the length-varying coding field, when Tflag is equal to 0, the LTP module is disabled, and no bit stream with the long-term flag needs to be output; when Tflag is equal to 1, the LTP module is enabled, and the bit stream that includes the first flag as the long-term flag is output, and this bit stream further includes an LPC coefficient $a_j$, a pitch, and a pitch gain.

In this embodiment, by judging whether the product of the empirical factor and the energy of the LPC residual signals which have undergone no LTP processing is greater than the energy of the LTP residual signals which have undergone LTP processing, the system knows whether the LTP module is enabled or disabled. When the speech signals are less periodic, the LTP processing almost makes no contribution, and the LTP module is disabled. Therefore, it is not necessary to consider the LTP contribution signals; fewer bits are consumed; and the compression performance of the encoder is improved.

Figure 4:
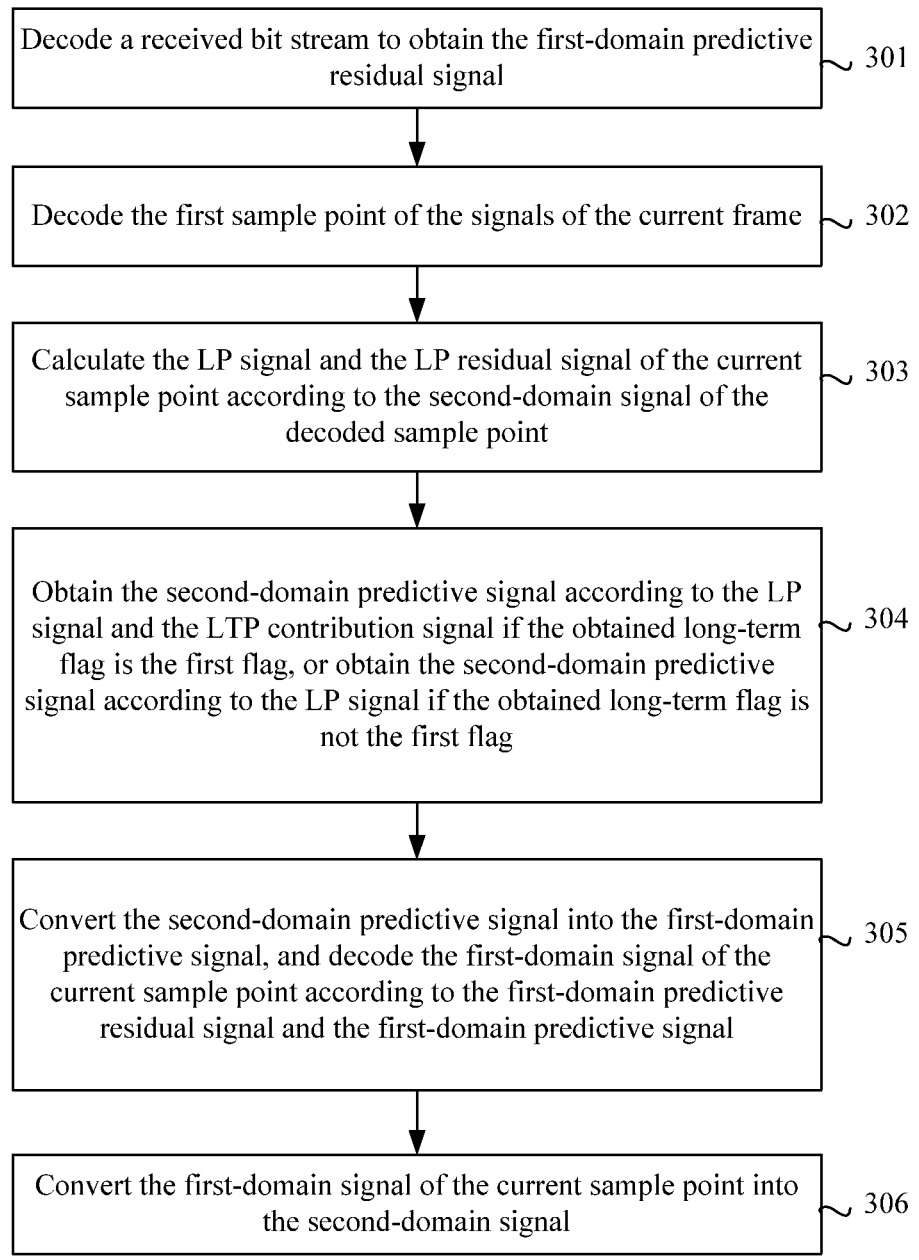
FIG. 4 is a flowchart of a signal decoding method in the first embodiment of the present disclosure.

FIG. 4 is a flowchart of a signal decoding method in the first embodiment of the present disclosure. The method includes the following steps:

Step 301: Decode a received bit stream to obtain the first-domain predictive residual signal.

Step 302: Decode the first sample point of the signals of the current frame.

Perform the decoding steps 303-306 consecutively for every current sample point from the second sample point of the signals of the current frame:

Step 303: Calculate the LP signal and the LP residual signal of the current sample point according to the second-domain signal of the decoded sample point.

Step 304: Obtain the second-domain predictive signal according to the LP signal and the LTP contribution signal if the obtained long-term flag is the first flag, or obtain the second-domain predictive signal according to the LP signal if the obtained long-term flag is not the first flag, where the LTP contribution signal is obtained according to the LP residual signal of the decoded sample point.

Step 305: Convert the second-domain predictive signal into the first-domain predictive signal, and decode the first-domain signal of the current sample point according to the first-domain predictive residual signal and the first-domain predictive signal.

Step 306: Convert the first-domain signal of the current sample point into the second-domain signal.

In this embodiment, the subsequent decoding process is performed adaptively according to the long-term flag; when the long-term flag is the second flag, it is not necessary to consider the LTP contribution signals, thus simplifying the decoding process.

Figure 5:
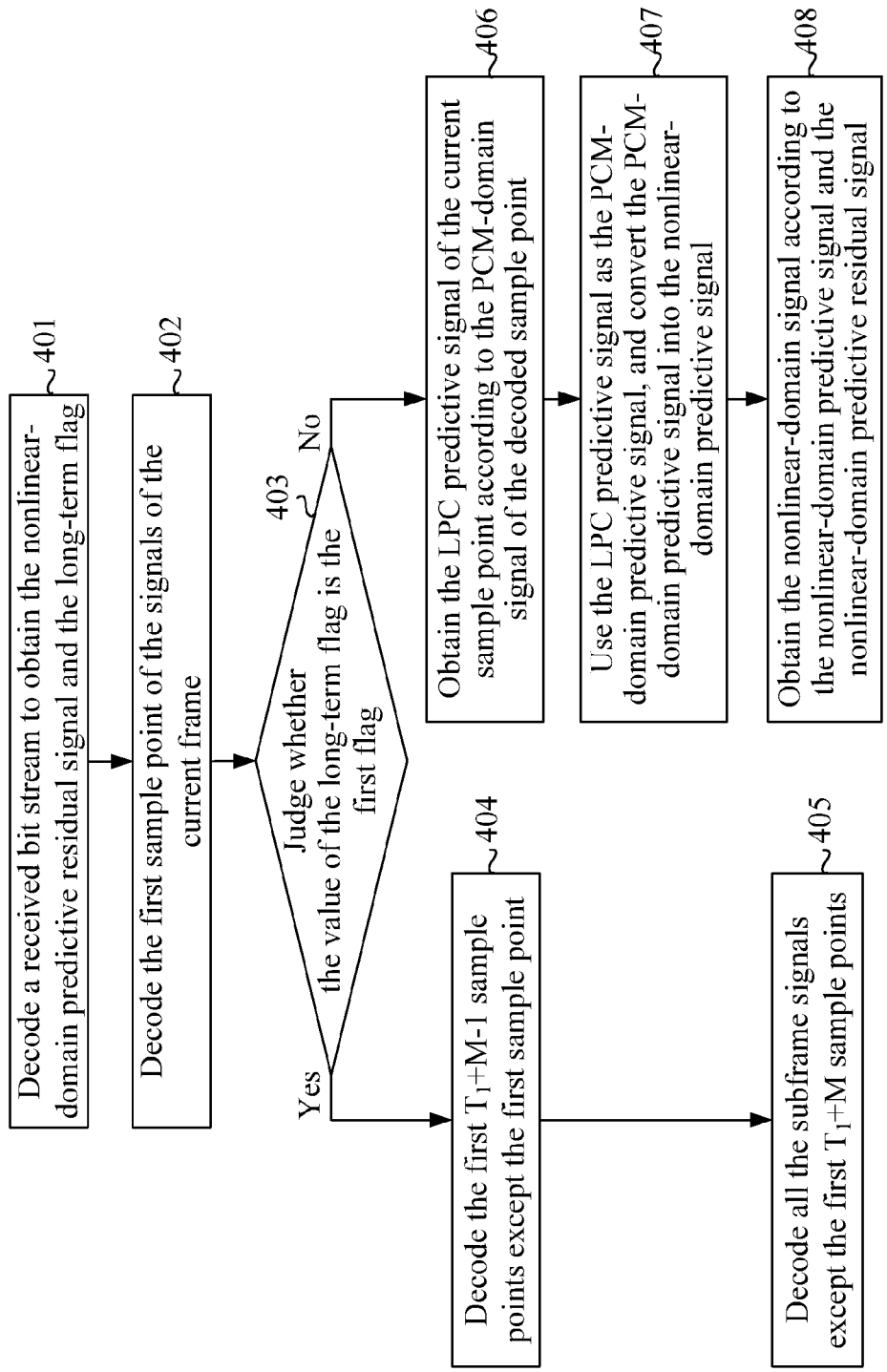
FIG. 5 is a flowchart of a signal decoding method in the second embodiment of the present disclosure.

FIG. 5 is a flowchart of a signal decoding method in the second embodiment of the present disclosure. The method in this embodiment may correspond to the signal coding method in the second embodiment, and the definitions of the terms and parameter expressions in this embodiment are the same as those in the second embodiment. The method in this embodiment includes the following steps:

Step 401: Decode a received bit stream to obtain the nonlinear-domain predictive residual signal and the long-term flag.

In some embodiments, if the bit stream includes the bit stream encoded with the long-term flag, the bit stream may be decoded to obtain the long-term flag. Specifically, when the long-term flag Tflag is equal to 0, the bit stream further includes an LPC coefficient $a_j$; when Tflag is equal to 1, the bit stream further includes an LPC coefficient $a_j$, a best pitch, and may further include a pitch gain. If the bit stream includes no pitch gain, the method in this embodiment further includes: selecting the pitch gain adaptively according to the best pitch.

Supposing d(i) represents the nonlinear-domain predictive residual signal, the following equation applies:

$$d(i) = x(i) - x'(i), i = 0, 1, \ldots, L-1 \qquad (12)$$

Therefore, the nonlinear-domain signal x(i) may be obtained through formula (13) after decoding:

$$x(i) = d(i) + x'(i), i = 0, 1, \ldots, L-1 \qquad (13)$$

Step 402: Decode the first sample point of the signals of the current frame.

The first sample point has undergone no LPC processing. Therefore, the nonlinear-domain predictive signal of the first sample point is x'(0)=0. Formula (13) reveals that the first sample point of the nonlinear domain may be decoded without loss, namely, x(0)=d(0).

For the subsequent decoding process, this embodiment needs to retain the PCM-domain signal y(0) of the first sample point and the LPC residual signal res(0) (namely, LP residual signal), where:

$$y(0)=A2PCM[x(0)], res(0)=y(0) \quad (14)$$

The function A2PCM[ ] refers to converting the Alaw signal into the PCM-domain signal.

In some embodiments, in the length-varying coding field, the received bit stream is decoded to obtain the first-domain predictive residual signal, without obtaining the long-term flag which is the second flag. When the decoding result includes the long-term flag which is the first flag, it indicates that the LTP module is enabled; otherwise, the LTP module is disabled. The system obtains the second-domain predictive signal according to the LP signal and the LTP contribution signal if the obtained long-term flag is the first flag, or obtains the second-domain predictive signal according to the LP signal if the obtained long-term flag is not the first flag, where the LTP contribution signal is obtained according to the LP residual signal of the decoded sample point.

Step 403: Judge whether the value of the long-term flag is the first flag; if so, proceed to steps 404-405; otherwise, skip to steps 406-408.

The LTP module comes in two states: enabled (Tflag=1), and disabled (Tflag=0). In this step, the system judges whether Tflag is equal to 1; alternatively, the system may judge whether Tflag is equal to 0 to know whether the LTP module is enabled. Different states of the LTP module correspond to different subsequent decoding processes.

After completion of step 403 in this embodiment, the following decoding process is a cyclic recursive process. The following decoding steps are performed consecutively for every current sample point from the second sample point of the signals of the current frame:

In some embodiments, if the coder side does not output the codes of the long-term flag which is the second flag, the system judges whether the first flag is obtained as the long-term flag; if so, steps 404-405 are performed; otherwise, steps 406-408 are performed.

Step 404: Decode the first $T_1+M-1$ samples except the first sample point.

Figure 6:
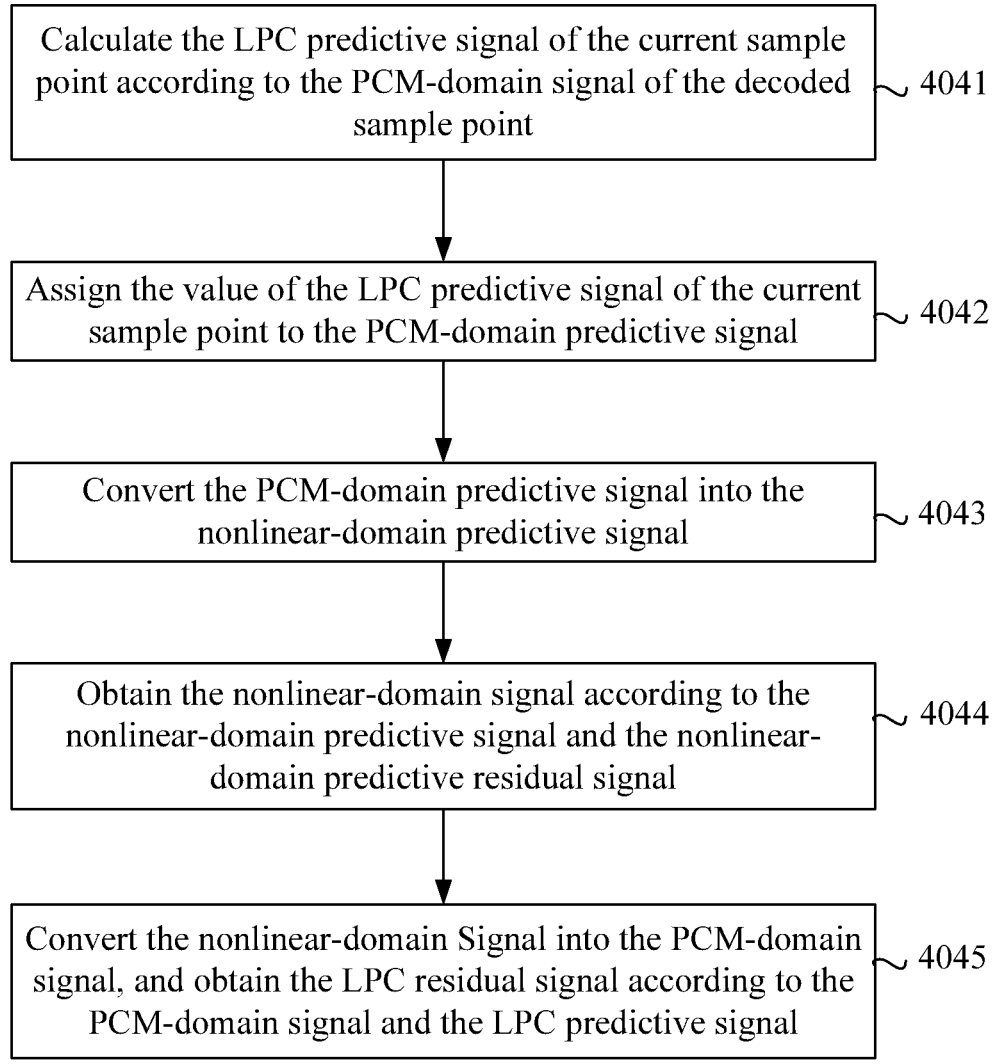
FIG. 6 is a flowchart of step 404 in the signal decoding method in the second embodiment of the present disclosure.

The method in this embodiment corresponds to the signal encoding method in the second embodiment. That is, in the encoding process, the first M samples the current frame do not participate in the LTP processing. Therefore, in this embodiment, the first M samples and the samples in the buffer are decoded first. FIG. 6 is a flowchart of step 404 in the signal decoding method in the second embodiment of the present disclosure. Further, step 404 may include the following steps:

Step 4041: Calculate the LPC predictive signal y'(i) of the current sample point according to the PCM-domain signal y(i) of the decoded sample point through formula (15):

$$y'(i) = \sum_{j=1}^{lpc\_order} a_j \cdot y(i-j), i = 1, 2, \ldots, T_1+M-1 \quad (15)$$

When $i \leq 0$, $y(i) = 0$.

For example, if the current sample point is the second sample point of the signals of the current frame, the decoded sample point is the first sample point of the signals of the current frame. In this case, the decoding result in step 402 serves as a reference.

Step 4042: Obtain the PCM-domain predictive signal y'(i) according to the LPC predictive signal y'(i) of the current sample. Because the first $T_1+M$ samples are not involved in the LTP processing, y"(i)=y'(i). That is, the value of the LPC signal of the current sample point is assigned to the PCM-domain predictive signal y"(i).

Step 4043: Convert the PCM-domain predictive signal y"(i) into the nonlinear-domain predictive signal x'(i):

$$x'(i)=PCM2A[y"(i)] \quad (16)$$

Step 4044: Obtain the nonlinear-domain signal x(i) through formula (13) according to the nonlinear-domain predictive signal x'(i) and the nonlinear-domain predictive residual signal d(i).

Step 4045: For the purpose of decoding subsequent samples, convert the nonlinear-domain signal x(i) into the PCM-domain signal y(i), and obtain the LPC residual signal res(i) according to the PCM-domain signal y(i) and the LPC predictive signal y'(i).

$$res(i)=y(i)-y'(i), i=0,1,\ldots,T_1+M-1 \quad (17)$$

Step 405: Decode all the subframe signals except the first $T_1+M$ samples.

Figure 7:
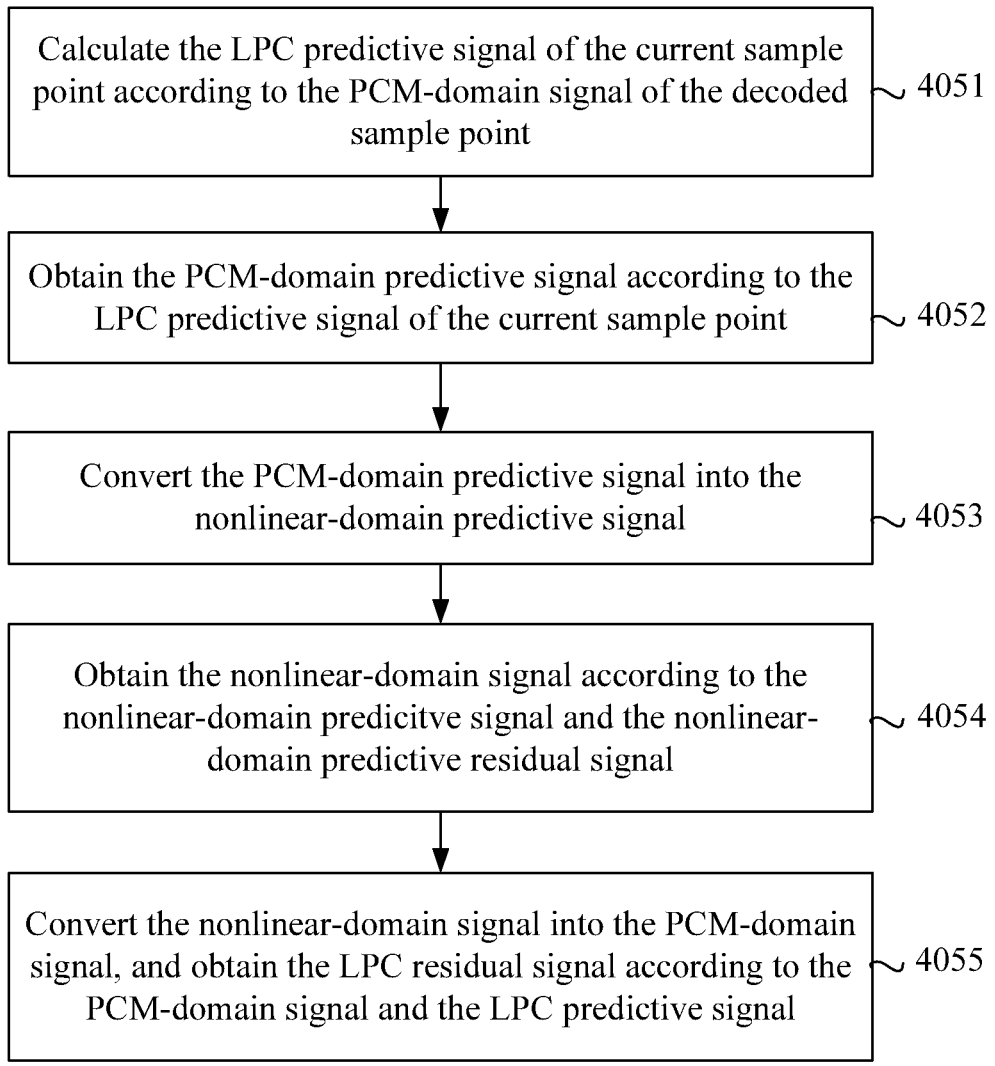
FIG. 7 is a flowchart of step 405 in the signal decoding method in the second embodiment of the present disclosure.

FIG. 7 is a flowchart of step 405 in the signal decoding method in the second embodiment of the present disclosure. Step 405 may include the following steps:

Step 4051: Calculate the LPC predictive signal y"(i) of the current sample point according to the PCM-domain signal y(i) of the decoded sample point through formula (18):

$$y'(i) = \sum_{j=1}^{lpc\_order} a_j \cdot y(i-j), i = n_0, \ldots, L-1 \quad (18)$$

When $i \leq 0$, $y(i) = 0$.

For example, if the current sample point is the first sample point of the first subframe, the decoded samples are the first $T_1+M$ samples. In this case, the decoding result in step 404 serves as a reference.

Step 4052: Calculate the PCM-domain predictive signal y"(i) according to the LPC predictive signal y'(i) of the current sample point through formula (19):

$$y"(i)=y'(i)+res'(i)=y'(i)+g \cdot res(i-T) \quad (19)$$

Step 4053: Convert the PCM-domain predictive signal y"(i) into the nonlinear-domain predictive signal x'(i):

$$x'(i)=PCM2A[y"(i)] \quad (20)$$

Step 4054: Obtain the nonlinear-domain signal x(i) through formula (13) according to the nonlinear-domain contribution signal x'(i) and the nonlinear-domain predictive residual signal d(i).

Step 4055: For the purpose of decoding subsequent samples, convert the nonlinear-domain signal x(i) into the PCM-domain signal y(i), and obtain the LPC residual signal res(i) according to the PCM-domain signal y(i) and the LPC predictive signal y'(i).

$$res(i)=y(i)-y'(i), i=n_0, \ldots, L-1 \quad (21)$$

After completion of decoding the current sample point, in the process of decoding subsequent samples, the LPC residual signal obtained in step 4055 is used to calculate the PCM-domain predictive signals of subsequent samples.

Step 406: Calculate the LPC predictive signal y'(i) of the current sample point according to the PCM-domain signal y(i) of the decoded sample point through formula (22):

$$y'(i) = \sum_{j=1}^{lpc\_order} a_j \cdot y(i-j), i = 1, 2, \ldots, L-1 \quad (22)$$

When $i \leq 0, \quad y(i) = 0.$

Step 407: Use the LPC predictive signal y'(i) as the PCM-domain predictive signal, and convert the PCM-domain predictive signal into the nonlinear-domain predictive signal x'(i).

Because the LTP module is disabled and no sample point of the current frame signal is involved in the LTP processing, y"(i)=y'(i), and y'(i) may be converted into x'(i) directly.

Step 408: Obtain the nonlinear-domain signal x(i) through formula (13) according to the nonlinear-domain predictive signal x'(i) and the nonlinear-domain predictive residual signal d(i).

In this embodiment, the subsequent decoding process is performed adaptively according to the long-term flag; when the long-term flag is the second flag, it is not necessary to consider the LTP contribution signals, thus simplifying the decoding process.

Figure 8:
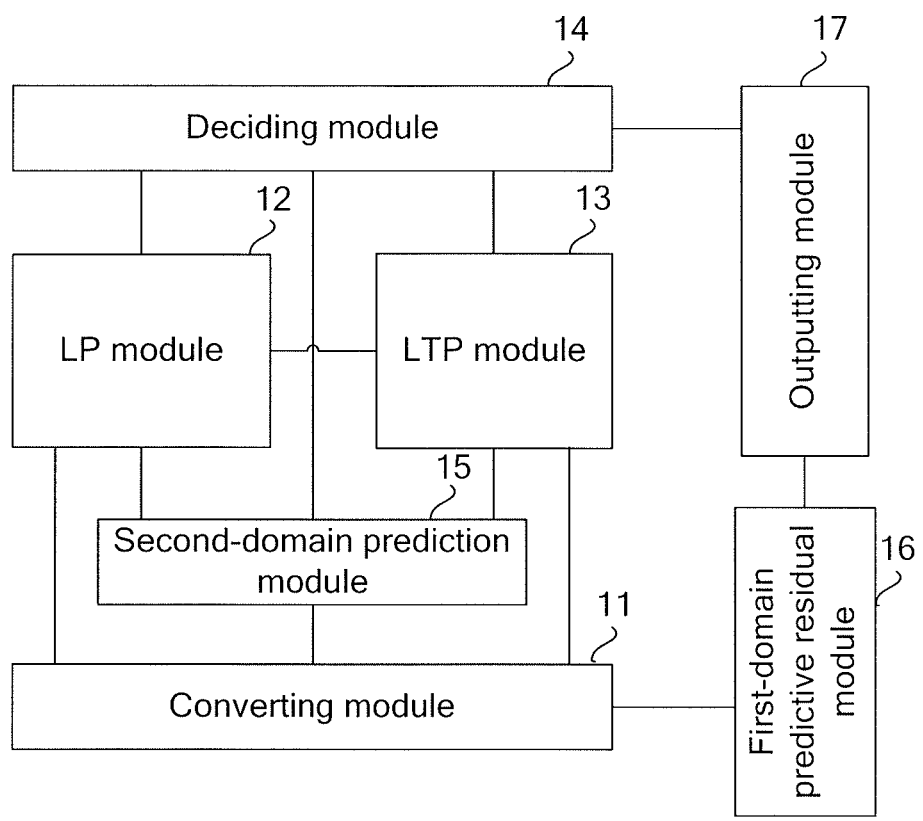
FIG. 8 shows a structure of a signal encoding apparatus in an embodiment of the present disclosure.

FIG. 8 shows a structure of a signal coding apparatus in an embodiment of the present disclosure. The apparatus includes: a converting module 11, an LP module 12, an LTP module 13, a deciding module 14, a second-domain prediction module 15, a first-domain predictive residual module 16, and an outputting module 17. The converting module 11 is adapted to: convert a first-domain signal into a second-domain signal, and convert a second-domain predictive signal into a first-domain predictive signal. The LP module 12 is adapted to perform LP processing for the second-domain signal. The LTP module 13 is adapted to perform LTP processing for the second-domain signal. The deciding module 14 is adapted to obtain a long-term flag according to decision criteria. The second-domain prediction module 15 is adapted to: obtain the second-domain predictive signal according to the LP processing result and the LTP processing result when the long-term flag is the first flag, and obtain the second-domain predictive signal according to the LP processing result when the long-term flag is the second flag. The first-domain predictive residual module 16 is adapted to calculate the first-domain predictive residual signal according to the first-domain predictive signal. The outputting module 17 is adapted to output a bit stream that includes the first-domain predictive residual signal.

The foregoing LP processing result may include an LP coefficient, LP signals, and LP residual signals. The foregoing bit stream may further include an LP coefficient.

Further, the LTP module 13 may perform pitch search for the LP residual signals to obtain the best pitch or both the best pitch and the pitch gain of the LP residual signals, and obtain the LTP contribution signals. The LTP processing result may include the best pitch or both the best pitch and the pitch gain, LTP contribution signals, and LTP residual signals.

The second-domain prediction module 15 is adapted to: use the sum of the LP residual signal and the LTP contribution signal as the second-domain predictive signal when the long-term flag is the first flag, or use the LP signal as the second-domain predictive signal when the long-term flag is the second flag.

The deciding module 14 may make a decision according to two decision criteria, namely, judge whether the product of the empirical factor and the energy of the LP residual signal is greater than the energy of the LTP residual signal, or judge whether the product of the empirical factor and the sum of the absolute values of the LP residual signals is greater than the sum of the absolute values of the LTP residual signals. If so, the deciding module 14 assigns the value of the first flag to the long-term flag; otherwise, the deciding module 14 assigns the value of the second flag to the long-term flag.

The apparatus in this embodiment may further include a pitch gain module which selects the pitch gain adaptively according to the obtained best pitch, and may further include a framing module which performs framing for the LP residual signals.

In this embodiment, the subsequent encoding process is performed adaptively according to the long-term flag; when the long-term flag is the second flag, it is not necessary to consider the LTP processing result, thus improving the compression performance of the codec.

Figure 9:
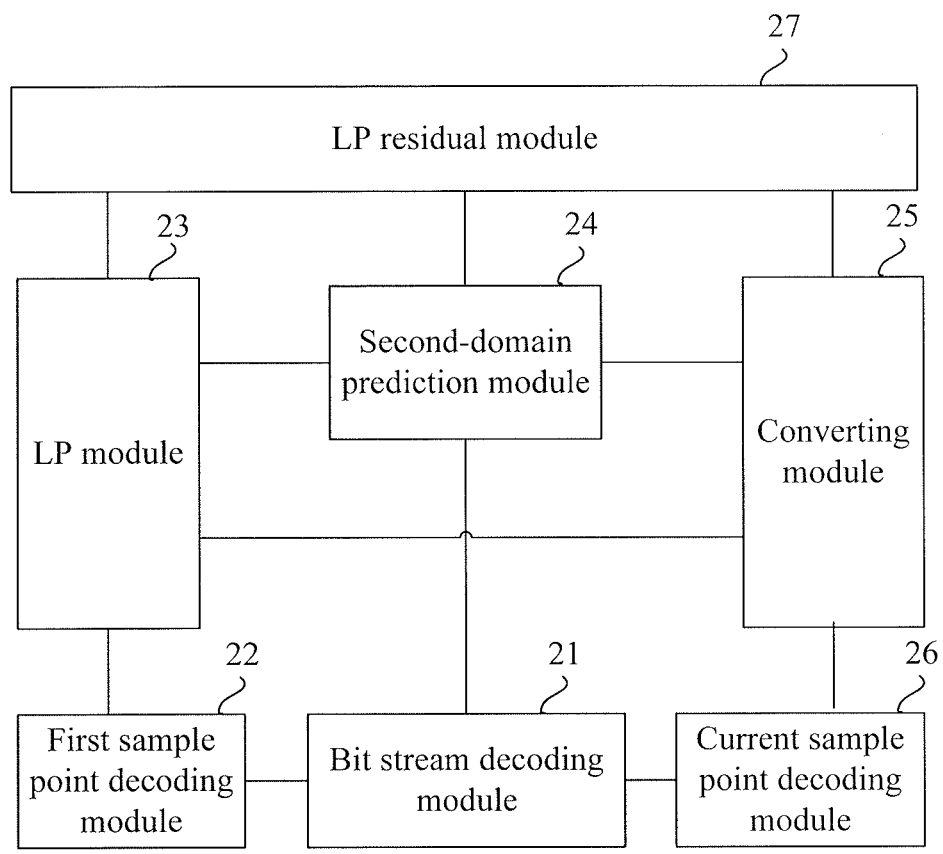
FIG. 9 shows a structure of a signal decoding apparatus in an embodiment of the present disclosure.

FIG. 9 shows a structure of a signal decoding apparatus in an embodiment of the present disclosure. The apparatus includes: a bit stream decoding module 21, a first sample point decoding module 22, an LP module 23, a second-domain prediction module 24, a converting module 25, a current sample point decoding module 26, and an LP residual module 27. The bit stream decoding module 21 is adapted to decode a received bit stream to obtain the first-domain predictive residual signal. The first sample point decoding module 22 is adapted to decode the first sample point of the signals of the current frame. The LP module 23 is adapted to calculate the LP signal of the current sample point according to the second-domain signal of the decoded sample point. The second-domain prediction module 24 is adapted to: obtain the second-domain predictive signal according to the LP signal and the LTP contribution signal if the obtained long-term flag is the first flag, or obtain the second-domain predictive signal according to the LP signal if the obtained long-term flag is not the first flag, where the LTP contribution signal is obtained according to the LP residual signal of the decoded sample point. The converting module 25 is adapted to: convert the second-domain predictive signal into the first-domain predictive signal, and convert the first-domain signal of the current sample point into the second-domain signal. The current sample point decoding module 26 is adapted to decode the first-domain signal of the current sample point according to the first-domain predictive residual signal and the first-domain predictive signal. The LP residual module 27 is adapted to obtain the LP residual signal according to the second-domain signal and the LP signal.

Further, when the long-term flag is the first flag and the current sample point is involved in the LTP processing at the encoder, the second-domain prediction module 24 uses the sum of the LP signal and the LTP contribution signal as the second-domain predictive signal; when the long-term flag is the first flag and the current sample point is not involved in the LTP processing at the encoder, the second-domain prediction module 24 uses the LP signal as the second-domain predictive signal.

The apparatus in this embodiment may further include a pitch gain module which selects the pitch gain adaptively according to the obtained best pitch.

In this embodiment, the subsequent decoding process is performed adaptively according to the long-term flag; when the long-term flag is the second flag, it is not necessary to consider the LTP contribution signals, thus simplifying the decoding process.

Figure 10:
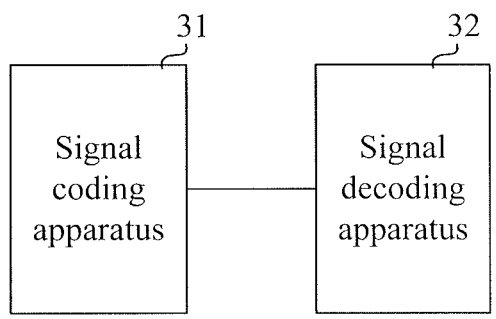
FIG. 10 shows a structure of a signal codec system in an embodiment of the present disclosure.

FIG. 10 shows a structure of a signal codec system in an embodiment of the present disclosure. The system includes a signal encoding apparatus 31 and a signal decoding apparatus 32.

The signal encoding apparatus 31 is adapted to: convert a first-domain signal into a second-domain signal; perform LP processing and LTP processing for the second-domain signal; obtain a long-term flag according to decision criteria; obtain the second-domain predictive signal according to the LP processing result and the LTP processing result when the long-term flag is the first flag; obtain the second-domain predictive signal according to the LP processing result when the long-term flag is the second flag; convert the second-domain predictive signal into the first-domain predictive signal, and calculate the first-domain predictive residual signal; and output a bit stream that includes the first-domain predictive residual signal.

The signal decoding apparatus 32 is adapted to: decode the received bit stream to obtain the first-domain predictive residual signal; decode the first sample point of the signals of the current frame; perform the following decoding steps consecutively for every current sample point from the second sample point of the signals of the current frame: calculate the LP signal of the current sample point according to the second-domain signal of the decoded sample point; obtain the second-domain predictive signal according to the LP signal and the LTP contribution signal if the obtained long-term flag is the first flag, where the LTP contribution signal is obtained according to the LP residual signal of the decoded sample point; or obtain the second-domain predictive signal according to the LP signal if the obtained long-term flag is not the first flag; convert the second-domain predictive signal into the first-domain predictive signal, and decode the first-domain signal of the current sample point according to the first-domain predictive residual signal and the first-domain predictive signal; and convert the first-domain signal of the current sample point into the second-domain signal, and obtain the LP residual signal according to the second-domain signal and the LP signal.

Further, the signal encoding apparatus 31 in this embodiment may be any signal coding apparatus described in the foregoing embodiments; and the signal decoding apparatus 32 may be any signal decoding apparatus described in the foregoing embodiments.

It is understandable to those skilled in the art that all or part of the steps of the foregoing method embodiments may be implemented by hardware instructed by a program. The program may be stored in a computer-readable storage medium. When being executed, the program performs steps of the foregoing method embodiments. The storage medium may be any medium suitable for storing program codes, for example, a Read Only Memory (ROM), a Random Access Memory (RAM), a magnetic disk, or a compact disk.

Although the disclosure is described through several exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A signal encoding method, comprising:
    converting a first-domain signal into a second-domain signal, wherein the first-domain signal is a nonlinear domain signal, and the second-domain signal is a Pulse Code Modulation (PCM) domain signal;
    performing a Linear Prediction (LP) processing and a Long-Term Prediction (LTP) processing for the second-domain signal to obtain a LP processing result and a LTP processing result;
    obtaining a long-term flag value according to a decision criterion, wherein the decision criterion is a comparison of the LP processing result and the LTP processing result;
    if the long-term flag value is a first value, obtaining a second-domain predictive signal according to the LP processing result and the LTP processing result, and, if the long-term flag value is a second value, obtaining a second-domain predictive signal according to the LP processing result;
    converting the second-domain predictive signal into a first-domain predictive signal, and calculating a first-domain predictive residual signal; and
    outputting a bit stream that comprises the first-domain predictive residual signal.

2. The method of claim 1, wherein the LP processing result comprises a LP signal.

3. The method of claim 2, wherein the LP processing result further comprises LP coefficients, and a LP residual signal, and the bit stream further comprises the LP coefficients.

4. The method of claim 3, wherein the LTP processing result comprises an LTP contribution signal.

5. The method of claim 4, wherein the LTP processing result further comprises the best pitch of the LP residual signal or both the best pitch of the LP residual signal and the pitch gain of the LP residual signal; and the performing LTP processing comprises:
    performing a pitch search for the LP residual signal;
    obtaining the best pitch of the LP residual signal or both the best pitch of the LP residual signal and the pitch gain of the LP residual signal; and
    obtaining an LTP contribution signal according to the LP residual signal and one of the best pitch of the LP residual signal and the pitch gain of the LP residual signal.

6. The method of claim 5, wherein before performing the pitch search for the LP residual signal, the method further comprises:
    formatting the LP residual signal into frames.

7. The method of claim 6, wherein splitting formatting the LP residual signal into frames comprises:
    formatting the LP residual signal adaptively into frames.

8. The method of claim 7, wherein formatting the LP residual signal into frames comprises:
    formatting adaptively the LP residual signals of the samples other than the samples of the first specified number into frames.

9. The method of claim 2, wherein before performing the LP processing, the method further comprises:
    performing a pitch search for the second-domain signal; and
    obtaining the best pitch of the second-domain signal.

10. The method of claim 9, wherein performing the LTP processing comprises:
    performing a fine search for the LP residual signal according to the best pitch of the second-domain signal;
    obtaining the best pitch of the LP residual signal or both the best pitch of the LP residual signal and the pitch gain of the LP residual signal; and
    obtaining an LTP contribution signal according to the LP residual signal and one of the best pitch of the LP residual signal and the pitch gain of the LP residual signal.

11. The method of claim 9, wherein when performing the fine search for the LP residual signal and obtaining the best pitch of the LP residual signal, the method further comprises:

selecting the pitch gain adaptively according to the obtained best pitch.

12. The method of claim 2, wherein obtaining a second-domain contribution signal according to the LP processing result comprises:
using the LP predictive signal as the second-domain predictive signal.

13. The method of claim 2, wherein obtaining a second-domain predictive signal according to the LP processing result and the LTP processing result comprises:
using the sum of the LP signal and the LTP contribution signal as the second-domain predictive signal.

14. The method of claim 1, wherein the bit stream further comprises the long-term flag value.

15. The method of claim 3, wherein the LTP processing result further comprises a LTP residual signal, and obtaining a long-term flag according to a decision criterion comprises:
judging whether the product of the energy of the LP residual signal and an empirical factor is greater than the energy of the LTP residual signal; and
assigning the long-term flag value as the first value if the product of the energy of the LP residual signal and an empirical factor is greater than the energy of the LTP residual signal; or
assigning the long-term flag value as the second value if the product of the energy of the LP residual signal and an empirical factor is not greater than the energy of the LTP residual signal.

16. The method of claim 3, wherein the LTP processing result further comprises a LP residual signal, and obtaining a long-term flag according to the decision criterion comprises:
judging whether the product of the sum of the absolute values of the LP residual signals and an empirical factor is greater than the sum of the absolute values of the LTP residual signals; and
assigning the long-term flag value as the first value if the product of the sum of the absolute values of the LP residual signals and an empirical factor is greater than the sum of the absolute values of the LTP residual signals; or
assigning the long-term flag value as the second value if the product of the sum of the absolute values of the LP residual signals and an empirical factor is not greater than the sum of the absolute values of the LTP residual signals.

17. A signal decoding method, comprising:
decoding a received bit stream to obtain a decoded first-domain predictive residual signal;
decoding a first sample point of a current frame of the bit stream;
performing the following decoding steps consecutively for every current sample point from the second sample point of the current frame;
calculating an Linear Prediction (LP) contribution signal of a current sample point according to a second-domain signal of the decoded sample point;
obtaining a long-term flag value, wherein the long-term flag value is determined by a decision criterion, wherein the decision criterion is a comparison of a LP processing result and a Long-Term Prediction (LTP) processing result of the first frame of the received bit stream;
obtaining a second-domain contribution signal according to the LP contribution signal and an LTP contribution signal if the long-term flag value is a first value, wherein the LTP contribution signal is obtained according to the LP residual signal of the decoded sample point;
obtaining a second-domain contribution signal according to the LP contribution signal if the long-term flag value is a second value;
converting the second-domain predictive signal into a first-domain predictive signal, and decoding a first-domain signal of the current sample point according to the first-domain predictive residual signal and the first-domain predictive signal; and
converting the first-domain signal of the current sample point into a second-domain signal, and obtaining an LP residual signal according to the second-domain signal and the LP contribution signal;
wherein the first-domain signal is a nonlinear domain signal, and the second-domain signal is a Pulse Code Modulation (PCM) domain signal.

18. The method of claim 17, wherein obtaining a second-domain predictive signal according to the LP contribution signal and an LTP contribution signal comprises:
if the current sample point in encoder side participates in the LTP processing, using the sum of the LP residual signal and the LTP contribution signal as the second-domain contribution signal; and
if the current sample point in encoder side does not participate in the LTP processing, using the LPC contribution signal as the second-domain contribution signal.

19. The method of claim 17, wherein the bit stream comprises both the best pitch and a pitch gain, or both the bit stream comprises the best pitch and a pitch gain, and the method further comprises:
selecting the pitch gain adaptively according to the best pitch.

20. A signal encoding device, comprising a processor and a signal transmitter, wherein:
the processor is configure to:
convert a first-domain signal into a second-domain signal, wherein the first-domain signal is a nonlinear domain signal, and wherein the second-domain signal is a Pulse Code Modulation (PCM) domain signal;
perform a Linear Prediction (LP) processing for the second-domain signal to obtain a LP processing result;
perform a Long-Term Prediction (LTP) processing for the second-domain signal to obtain a LTP processing result;
obtain a long-term flag value according to a decision criterion, wherein the decision criterion is a comparison of the LP processing result and the LTP processing result;
if the long-term flag value is a first value, obtain a second-domain predictive signal according to the LP processing result and the LTP processing result; and, if the long-term flag value is a second value, obtain the second-domain predictive signal according to the LP processing result;
convert the second-domain predictive signal into a first-domain predictive signal; and
calculate a first-domain predictive residual signal according to the first-domain predictive signal;
and the signal transmitter is configure to output a bit stream that includes the first-domain predictive residual signal.

21. A signal decoding device, comprising a processor and a signal receiver, wherein:
the signal receiver is configured to receive a bit stream,
the processor is configured to decode the received bit stream to obtain a first-domain predictive residual signal;
decode a first sample point of a current frame of the bit stream and obtain a long-term flag value, wherein the long-term flag value is determined by a decision criterion, wherein the decision criterion is a comparison of a Linear Prediction (LP) processing result and a Long Term Prediction (LTP) processing result of the first frame of the bit stream;

calculate an LP signal of a current sample point according to a second-domain signal of the decoded sample point;

obtain a second-domain predictive signal according to the LP signal and an LTP contribution signal if the long-term flag value is a first value, or obtain a second-domain predictive signal according to the LP signal if the long-term flag value is a second value, where the LTP contribution signal is obtained according to the LP residual signal of the decoded sample point;

convert the second-domain predictive signal into a first-domain predictive signal, and convert the first-domain signal of the current sample point into a second-domain signal;

decode the first-domain signal of the current sample point according to the first-domain predictive residual signal and the first-domain predictive signal; and obtain an LP residual signal according to the second-domain signal and the LP predictive signal, wherein the first-domain signal is a nonlinear domain signal, and the second-domain signal is a PCM domain signal.

22. A signal codec system, comprising a processor, a signal encoder and a signal decoder, wherein:

the signal encoder is configured to convert a first-domain signal into a second-domain signal; perform a Linear Prediction (LP) processing and a Long Term Prediction (LTP) processing for the second-domain signal to obtain a LP processing result and a LTP processing result; obtain a long-term flag value according to a decision criterion; obtain a second-domain predictive signal according to the LP processing result and the LTP processing result if the long-term flag value is a first value; or obtain the second-domain predictive signal according to the LP processing result if the long-term flag value is a second value; convert the second-domain predictive signal into a first-domain predictive signal and calculate a first-domain predictive residual signal; and output a bit stream to the decoder that includes the first-domain predictive residual signal, wherein the decision criterion is a comparison of the LP processing result and the LTP processing result and wherein the first-domain signal is a nonlinear domain signal, and the second-domain signal is a PCM domain signal;

the signal decoder is configured to decode the received bit stream to obtain the first-domain predictive residual signal and the long-term flag value; decode a first sample point of a current frame of the bit stream; perform the following decoding steps consecutively for every current sample point from a second sample point of the current frame: calculate an LP signal of a current sample point according to the second-domain signal of the decoded sample point; obtain the second-domain predictive signal according to the LP signal and an LTP contribution signal if the long-term flag value is the first value, or obtain the second-domain predictive signal according to the LP signal if the long-term flag value is the second value, wherein the LTP contribution signal is obtained according to the LP residual signal of the decoded sample point; convert the second-domain predictive signal into the first-domain predictive signal, and decode the first-domain signal of the current sample point according to the first-domain predictive residual signal and the first-domain predictive signal; and convert the first-domain signal of the current sample point into the second-domain signal, and obtain the LP residual signal according to the second-domain signal and the LP signal.

* * * * *